Figure 1:
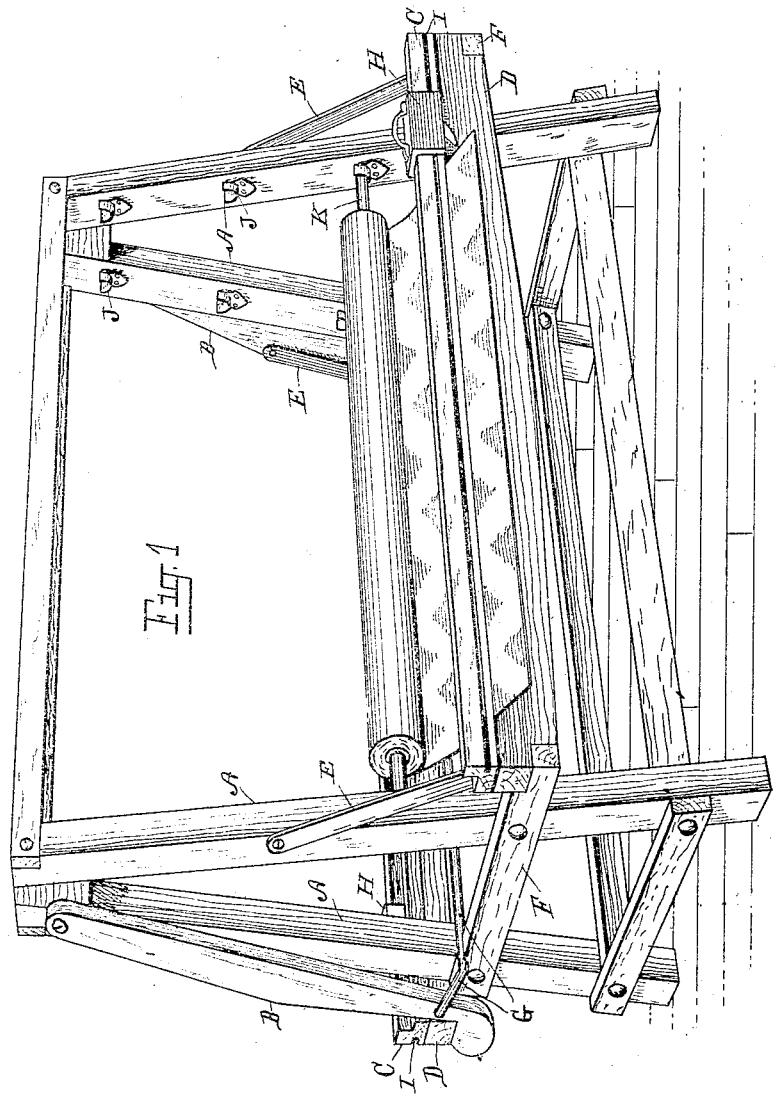

(No Model.) 2 Sheets—Sheet 1.

S. FRANK.
SALES AND EXHIBITING RACK.

No. 559,795. Patented May 12, 1896.

Witnesses:
Walter S. Wood
Marian Longyear

Inventor,
Saul Frank
By Fred L. Chappell
Att'y.

(No Model.) 2 Sheets—Sheet 2.
S. FRANK.
SALES AND EXHIBITING RACK.
No. 559,795. Patented May 12, 1896.
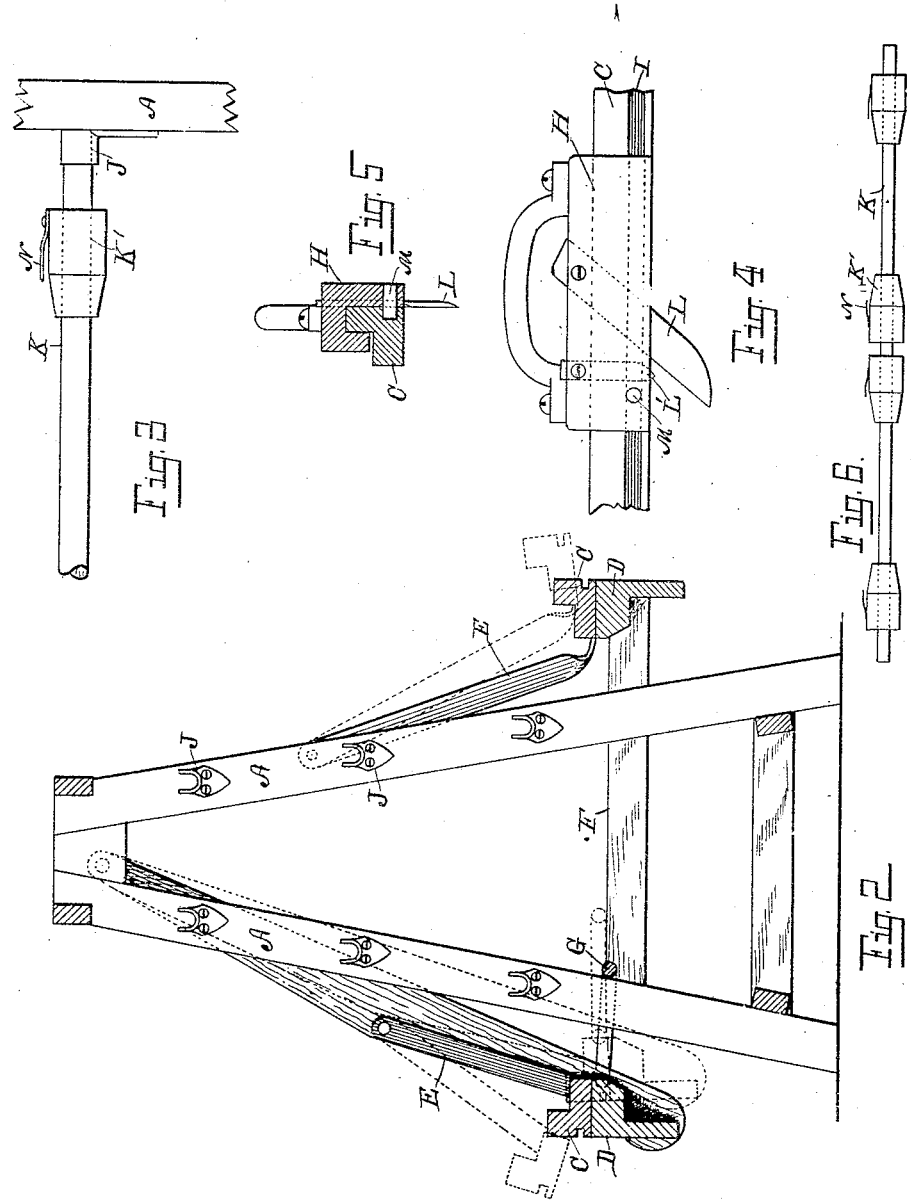
Witnesses
Walter S. Wood
Marian Longyear.
Inventor,
Saul Frank
By Fred L. Chappell
Atty.

UNITED STATES PATENT OFFICE.

SAUL FRANK, OF GOBLEVILLE, MICHIGAN.

SALES AND EXHIBITING RACK.

SPECIFICATION forming part of Letters Patent No. 559,795, dated May 12, 1896.

Application filed June 10, 1895. Serial No. 562,305. (No model.)

*To all whom it may concern:*

Be it known that I, SAUL FRANK, a citizen of the United States, residing at Gobleville, in the county of Van Buren and State of Michigan, have invented a certain new and useful Improved Sales and Exhibiting Rack, of which the following is a specification.

My invention relates to improvements in sale and exhibiting racks for linoleums, oil-cloths, and similar goods which are sold from rolls. Merchants at present who handle oil-cloths and linoleums usually provide a room of considerable floor-space on purpose to exhibit these goods and to enable the salesman to spread them upon the floor to exhibit them and in order to use a knife or other cutting-tool for cutting off the goods to the proper length along a straight-edge. This requires a large amount of room, very heavy lifting where the rolls are full size, and very considerable amount of time to exhibit the goods properly to the customer, also very considerable amount of time afterward to take care of the rolls after the sale has been made, and it is also a task of very considerable difficulty to properly cut off the piece sold from the roll. The handling of the rolls, tipping them up on end, and turning them down causes a breakage of the material at the ends of the rolls, and the awkward method of handling the material very frequently causes a breaking of the linoleum or oil-cloth crosswise of the roll where it is inconvenient to spread it out. The standing on end also wears the edges in addition to breaking them. In view of these facts I have produced a sale-rack (here shown) the objects of which are, first, to provide a compact rack which will support a large amount of goods in a comparatively small space in a convenient manner for exhibiting or for cutting off the piece; second, to provide, in connection with such a rack, a convenient and effective means for cutting off the piece from the roll; third, to provide improved means of holding the material to cut it off properly; fourth, to provide an improved bracket and means for supporting the rolls upon the frame; fifth, to provide convenient means for supporting several rolls, so that they can be operated independently on the same shaft; sixth, to provide an improved means of handling the rolls upon the shaft; seventh, to provide an improved knife adapted for cutting very heavy linoleums with ease and accuracy; eighth, to provide a sales and exhibiting rack which shall prevent unnecessary wear and tear upon the goods in handling the same. I accomplish these objects of my invention by the devices shown in the accompanying drawings, in which—

Figure 1 is a perspective view of my improved rack with a single roll of merchandise in place. Fig. 2 is a transverse sectional view through the entire rack, looking toward the right, the roll of merchandise being removed. Fig. 3 is an enlarged detail view of one of the cones for supporting the end of a roll. Fig. 4 is an enlarged detail view of my improved cutting device. Fig. 5 is a sectional view on line 5 5 of Fig. 4, looking in the direction of the little arrows at the ends of the section-line. Fig. 6 is a detail view showing the method of construction and operation where more than one roll of merchandise is supported on a single shaft or rod.

In the drawings similar letters of reference refer to similar parts throughout the several views.

My improved rack, as shown in the drawings, is constructed double, so that tiers of rolls can be supported on either side of the same.

Referring to the lettered parts of the drawings, A A A A are corner posts or standards of the frame. These are connected together at the bottom by cross-pieces or girths F and at the top by suitable blocks and by longitudinal beams or girths, the whole being joined together by suitable bolts. To the front of the frame the beams F project forward and support on their outer ends a beam D. Resting on this beam is a suitable straight-edge C, which corresponds with the outer edge of the beam D, which is also straight. This straight-edge C is supported by downwardly-projecting arms E E, which are suitably pivoted to the outside of the posts A A to each end of the frame. On the straight-edge C is supported a suitable block H, bearing the downwardly and forwardly projecting knife L, which is sharpened on its upper edge. In front of the knife L is a knife L', the point of which projects down a short distance below the lower edge of the straight-edge C.

This block and knives are supported in a suitable groove by means of the pin M in the block, which is adapted to reciprocate back and forth in its guideway, carrying the knife close to the outside of the straight-edge. To the opposite side of the rack the construction is quite similar, with the exception that the cross-piece D and the straight-edge C above it are carried on heavy upwardly-projecting arms B, which project nearly to the top of the frame. The beam and straight-edge are adjustable back and forth from the frame, a suitable bail G being pivotally connected to the outside of the arms B and passing around through the middle portion of the frame, where it is adapted to drop down in a suitable notch, when the beam B is pulled forward to retain it in that position. Arms E project up and are pivoted to the heavier arms B in this instance to support the straight-edge C.

Suitable shafts or rods K are supported to each side of the frame in suitable brackets J, which are adapted to be secured to the inside of the posts A, and form suitable open boxes in which the ends of the shafts or rods K are laid. On these shafts K the rolls of fabric are supported. The shafts rest between the posts A A, so that they cannot move in a longitudinal direction. On the shafts are supported cones K', which are adapted to project into the ends of the rolls. On these are attached suitable thin trips or metal tongues N, which engage over the inner thickness of the roll of fabric to secure the same firmly on the cones K'. The cones K' are supported revolubly on shafts K. Where the roll is long, as indicated in Fig. 1, a cone is placed in each end of the same and supports it, so that it can be unrolled and rolled up as desired. Where two short rolls are desired to be supported, as is frequently the case, two pairs of cones K' are placed on the shaft K, as indicated in Fig. 6, and as the cones or plugs revolve upon the shaft independent of each other either roll can be drawn from, as desired.

In exhibiting goods where only the lighter weights, such as table oil-cloths and the like, are handled they are placed on the front side of the rack and are drawn out to be exhibited. When they are exhibited, as desired, and a sale has been made, the end of the roll is passed between the straight-edge C and beam D, and it is drawn out to the length required and the straight-edge C is pressed down tight upon the same and held in place securely, owing to the fact that the arms E project up to a considerable distance and enable a great pressure to be applied to clamp the fabric firmly between the straight-edge C and beam D. The cutting device is then passed along, carrying the knife L close to the outside of the straight-edge and cuts the fabric off at right angles, because the shaft K and the straight-edge are exactly parallel.

The knife cuts the fabric from the under side so that it cuts the woven foundation first and allows the coating to separate easily without dulling the knife by splitting or breaking it apart. On the back side of the frame or to the left in Fig. 2, as indicated in the drawings, the heavier rolls are placed, such as heavy-weight linoleums. In handling these a short bend in them will cause a break, which damages the merchandise. To prevent this short bend I have provided a means of drawing one beam out, as indicated, and supporting it by the bail G, dropping into suitable notches in the cross-pieces or girths F. The linoleums are clamped securely by pressing down the straight-edge C, as before, which is pivoted to the arms B instead of to the posts A, as it is on the opposite side of the machine. In cutting very heavy linoleums it is desirable to adjust the knife-point L' so that it shall mark or cut into the material on the upper side before the knife L reaches it on the under side to make a perfectly even cut without breaking the coating to the linoleums above. On the lighter weights the point L' is not needed and in fact it is not desirable to use it.

Having thus described my invention I desire to state that it can be constructed as a wall-rack instead of a general frame and support the rolls up and down the sides of the wall, and swinging arms B can be used in connection with the cutting apparatus, or the straight-edge can be used with a bar rigid with the frame, depending on the class of goods to be exhibited and cut off.

Variations in the construction of the frame will readily suggest themselves to those skilled in the art to which my invention pertains, and it will be readily understood that it is capable of considerable variation in its details.

Having thus described my invention, what I claim as new, and desire to secure by Letters Patent, is—

1. In a sale-rack, the combination of the frame having the upright corner timbers, A, A, A, A; the brackets, J, supported on the inner side of said corner timbers; shafts, K, supported in said brackets; tapered plugs, K', K', revolubly supported on said shafts, K; tongues, N, on said tapered plugs, K', for engaging over the inner thickness of the rolls to retain the same upon the plugs; the beam, D, supported by upwardly-extending arms, B, to each side of the frame; a bail, G, attached to said arms, B, adapted to engage in suitable notches in said frame; the straight-edge, C, with a suitable guide thereon supported by upwardly-extending arms, E, pivoted to the arms, B, and adapted to fit and coincide with the outer edge of the beam, D; a block, H, supported in a guide on the straight-edge, C; a downwardly and forwardly extending knife, L, sharpened along the upper edge and supported in the block, H, to pass close to the outside of the straight-edge, C; the vertical knife, L', supported in the block, H, the point of which is adjustable to cut into the upper side of the linoleum in advance of the blade, L, all coacting together substantially as described for the purpose specified.

2. In a sale-rack, the combination of the beam, D, suitably supported, the outer edge of which is a clamping straight-edge; the straight-edge, C, upwardly-projecting arms connected to said straight-edge and pivotally connected above; a block, H, suitably guided along said straight-edge; a knife, L, projecting downwardly and forwardly from said block, H, with the upwardly-projecting edge sharpened to pass close to the outside of said straight-edge and beam for the purpose of cutting off the fabric, from the under side, as described.

3. In a sales-rack, the combination of the beam, D, suitably supported by upwardly-extending arms, B, at each end thereof pivoted at their upper ends; a straight-edge, C, supported on upwardly-projecting arms, E, the upper ends of which are pivotally connected to the arms, B, B, above; a block H, suitably guided along said straight-edge; a knife, L, projecting downwardly and forwardly from said block, H, sharpened on the upwardly-projecting edge passed close to the outside of the straight-edge and beam; and a bail, G, adapted to engage in a suitable notch in the frame for adjusting the beam, D, to and from the frame, as specified.

4. In a sale-rack, the combination of the beam, D, pivotally supported by upwardly-projecting arms connected thereto and pivoted at their upper ends in a line parallel with the rolls on said rack; a clamping straight-edge which rests on the upper side of the beam, D, and a downwardly and forwardly projecting knife with its edge upward guided to pass under the fabric to cut the same from the under side, as specified.

5. In a cutting-tool for cutting heavy linoleums, the combination of the straight-edge, C; the block, H, suitably guided thereon; the downwardly and forwardly projecting knife L; the knife, L', in advance of the knife, L, the point of which is to mark or cut into the upper side of the linoleum in passing, as specified.

6. In a display-rack, the combination of the shaft, K; revoluble plugs, K', thereon for insertion into the ends of the rolls of fabric; and lips or tongues, N, to engage over the inner thickness of the fabric of the roll to retain it on the plugs to permit the fabric being rolled and unrolled without becoming detached from the plug, as desired.

7. In a sale-rack, the combination of a beam, D, adjustable to and from said rack to accommodate stiff material as heavy floor oil-cloths and linoleums; a straight-edge adapted to rest on the upper side of the beam, D, and coincide with the outer edge; a downwardly and forwardly projecting knife suitably guided along said straight-edge to cut off the fabric as desired, for the purpose specified.

8. In a sale-rack, the combination of the shaft, K; pairs of oppositely-facing plugs, K' with tongues N thereon, to engage the inner thickness of fabric, for insertion in the ends of rolls of fabric revolubly supporting them on said shaft, K, so that more than one roll of material can be supported on the same shaft and each roll be drawn from independently, as specified.

In witness whereof I have hereunto set my hand and seal in the presence of two witnesses.

SAUL FRANK. [L. S.]

Witnesses:
MARIAN I. LONGYEAR,
WALTER S. WOOD.